J. A. MUNRO.
SEAT OF MOTOR VEHICLES.
APPLICATION FILED SEPT. 12, 1918.
1,315,031.
Patented Sept. 2, 1919.
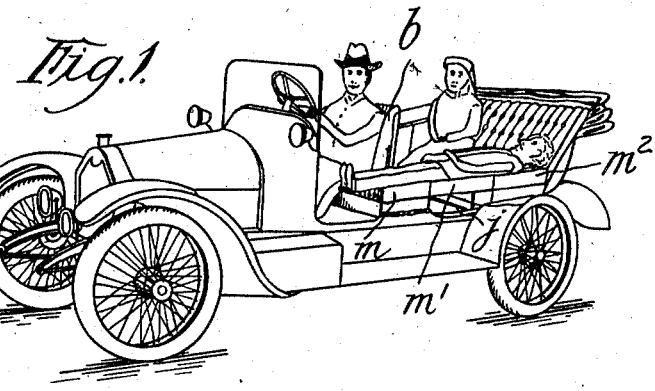
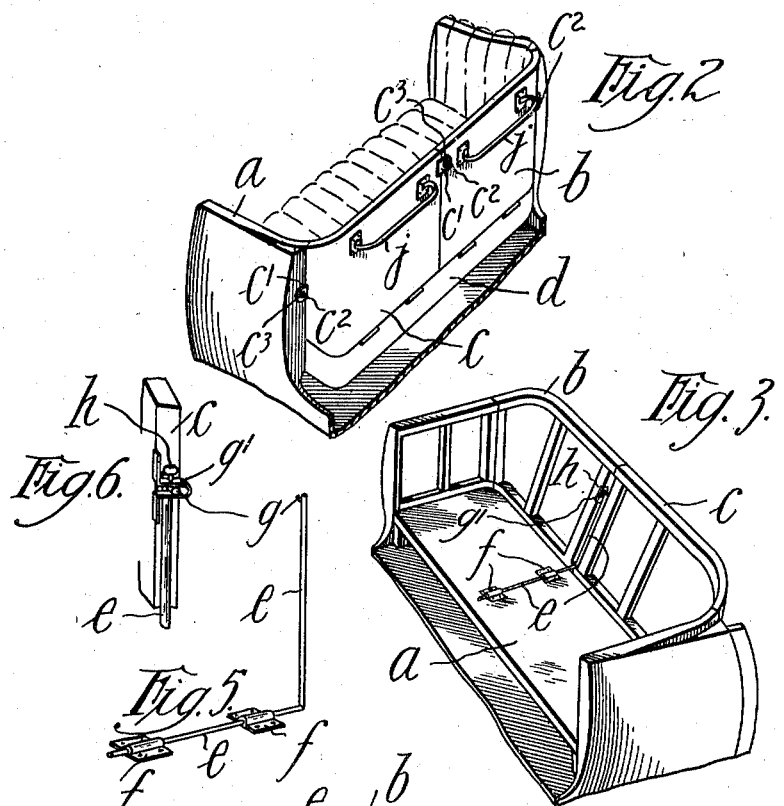
INVENTOR
James A. Munro
BY
his attys

UNITED STATES PATENT OFFICE.

JAMES ANGUS MUNRO, OF MELBOURNE, VICTORIA, AUSTRALIA.

SEAT OF MOTOR-VEHICLES.

1,315,031.            Specification of Letters Patent.        Patented Sept. 2, 1919.

Application filed September 12, 1918. Serial No. 253,694.

*To all whom it may concern:*

Be it known that I, JAMES ANGUS MUNRO, a subject of the King of Great Britain, residing at Melbourne, in the State of Victoria, Australia, have invented certain new and useful Improvements in Seats of Motor-Vehicles; and I do declare the following to be a full, clear, and exact description of the invention, such as will enable others skilled in the art to which it appertains to make and use the same.

This invention consists of certain improvements in the construction of the seating accommodation of motor cars and other vehicles whereby the front seat and rear seat may be so utilized as to be quickly adjusted to form a couch or bed of sufficient length to accommodate one or more persons in a recumbent position without interference to the seat occupied by the driver of the car or like vehicle. The invention has been especially devised to facilitate the speedy adjustment of part of the front seat and back thereof to form a couch or continuous cushion as means for conveying a person without interference with the seating facilities of the driver, and at the same time leaving a portion of the rear seat to be utilized by an attendant or passenger.

When, however, it is desirable to transform the whole of the car's seating accommodation into a couch or bed, both of the halves of the back of the front seat are capable of being similarly lowered into a horizontal position.

In order that my invention may be the more easily understood, reference will be made to the accompanying sheet of drawings in which—

Figure 1 illustrates a motor-car, altered according to this invention and showing, as an instance the vehicle being used as an ambulance conveyance, the side of the body of the car being in section for sake of clearness.

Fig. 2 is a view of the rear support of the back of the front seat, portion of the upholstering being removed to better illustrate the particular construction.

Fig. 3 illustrates the front seat, and shows one form of means for rigidly holding the driver's portion of the seat.

Fig. 4 is a sectional view of a body of a car, the driver's portion of the front seat being vertical, and the other portion lowered to a horizontal position, to form, with the rear seat, a continuous couch or bed and Figs. 5 and 6 illustrate details of the means hereinbefore referred to, for rigidly holding the driver's portion of the front seat.

In this invention the back of the front seat $a$ is constructed in two pieces, $b$ and $c$, hinged to the lower plate $d$ to permit radial movement to an extent necessary to abut against the rear seat $a'$ (see Fig. 4), and so form a level couch or bed.

To maintain rigidity of the back portion $b$ of the front seat $a$ when the latter is required to be in the upright position, I provide an adjustable swinging L-shaped rod $e$ operating in hinged plates $f$, secured to the flat wooden portion of the seat $a$. The top of the rod is provided with a pin $g$ which engages a holder $g'$ fixed to the frame of $b$, a screw bolt $h$ being disposed on the top of $g'$ and engaging the pin $g$ to hold same firmly. To the backs of the respective portions of the front seat hand rails $j$ or other suitable devices are fitted to operate as hand rails when the back is in an upright position, and also as a support by contact with the floor $k$ of the car or other vehicle when the back portions are lowered to the same plane as the front and rear seats $a$ and $a'$.

To firmly hold the portions $c$ and $b$, when vertical, I preferably use a plate $c'$ with screw stud $c^2$ and nuts $c^3$, placed respectively where shown.

Gaps between the meeting places of the cushions $m$, $m'$ and $m^2$, when the portion $c$ of the back of the front seat is lowered may be filled by portable cushions suitably shaped, or swinging cushions, as $n$, may be employed, the latter being hinged to the frame of the rear seat and when not in use will lie in the recess $n'$ formed at the rear of the seat $a'$ (see Fig. 4). If it is necessary to bring the cushion $m^2$ forward, such cushion will first be raised, and the swinging cushion $n$ rotated to the position shown by dotted lines Fig. 4; by doing so, the gap will be filled by the part $n$ and all the cushions held in set positions.

I claim:

1. In a motor vehicle and in combination with a slidable seat and the back thereof, a cushion associated with the back of the slidable seat normally adapted to lie in a recess in the said seat and when the seat is moved forward to be shifted to fill the gap between the seat and the back thereof.

2. In a motor vehicle and in combination with a slidable seat thereof, a cushion pivotally connected to the back of the slidable seat so as to normally lie in a recess in the said seat and when the seat is moved forward to be swung to position to fill the gap between the seat and the back thereof.

3. In a motor vehicle in which the backs of the front seats are adapted to be lowered to substantially the same plane as the rear seat and in combination, a back seat shiftable to fill the gap between the forward edge thereof and the adjacent edges of the backs of the front seats when lowered, and a cushion pivotally connected to the back of the rear seat so as normally to lie in a recess in the said rear seat and adapted, when the rear seat is shifted to fill the gap between the same and the adjacent edges of the backs of the front seats when lowered, to be swung to fill the space between the rear seat and the back thereof.

In testimony whereof I have signed my name to this specification in the presence of two subscribing witnesses.

JAMES ANGUS MUNRO.

Witnesses:
W. O. SACHSE,
AUGUSTINE THOMAS MADDEN.

Copies of this patent may be obtained for five cents each, by addressing the "Commissioner of Patents, Washington, D. C."